United States Patent
Kim

(10) Patent No.: US 10,964,489 B2
(45) Date of Patent: Mar. 30, 2021

(54) UPPER MOLD FOR MLCC LAMINATION

(71) Applicant: 21TH CENTURY CO., LTD., Gyeonggi-do (KR)

(72) Inventor: Sung Hwan Kim, Gyeonggi-do (KR)

(73) Assignee: 21TH CENTURY CO., LTD, Hwanseong-si (KR)

( * ) Notice: Subject to any disclaimer, the term of this patent is extended or adjusted under 35 U.S.C. 154(b) by 312 days.

(21) Appl. No.: 16/099,129

(22) PCT Filed: Nov. 21, 2017

(86) PCT No.: PCT/KR2017/013290
§ 371 (c)(1),
(2) Date: Nov. 5, 2018

(87) PCT Pub. No.: WO2018/135740
PCT Pub. Date: Jul. 26, 2018

(65) Prior Publication Data
US 2020/0294732 A1    Sep. 17, 2020

(30) Foreign Application Priority Data
Jan. 17, 2017 (KR) .......................... 10-2017-0008013

(51) Int. Cl.
*H01G 13/00* (2013.01)
*H01G 4/12* (2006.01)
(Continued)

(52) U.S. Cl.
CPC .............. *H01G 13/00* (2013.01); *H01G 4/12* (2013.01); *H01G 4/1227* (2013.01);
(Continued)

(58) Field of Classification Search
None
See application file for complete search history.

(56) References Cited

U.S. PATENT DOCUMENTS 5,261,986 A * 11/1993 Kawabata ............... B28B 3/024
156/235
5,358,593 A * 10/1994 Hamuro .................. B32B 37/02
156/378
(Continued)

FOREIGN PATENT DOCUMENTS

JP    H07164416    6/1995
JP    2002144270    5/2002
(Continued)

*Primary Examiner* — Dion Ferguson
(74) *Attorney, Agent, or Firm* — Goldilocks Zone IP Law

(57) ABSTRACT

An upper mold for MLCC lamination comprising: a vacuum head comprising a first area formed by a plurality of base holes, which communicate with an air channel formed on the upper surface, and by through-holes that connect the lower surface and respective base holes so as to communicate with each other such that air flows between the base holes and the lower surface, the first area having a predetermined area, and the vacuum head comprising a second area configured, thereby suctioning air; a mesh plate fixed to the lower surface of the vacuum head to have a size corresponding to that of the first area, the mesh plate having a porous structure such that, when air flows through the through-holes of the first area, suction and discharge can occur evenly; and a contact plate fixed to the lower surface of the vacuum head by adhesion of the second area.

7 Claims, 6 Drawing Sheets

(51) Int. Cl.
*H01G 4/232* (2006.01)
*H01G 4/012* (2006.01)
*H01G 4/248* (2006.01)
*H01G 4/30* (2006.01)

(52) U.S. Cl.
CPC ........... *H01G 4/012* (2013.01); *H01G 4/2325* (2013.01); *H01G 4/248* (2013.01); *H01G 4/30* (2013.01)

(56) References Cited

U.S. PATENT DOCUMENTS

| | | | | |
|---|---|---|---|---|
| 5,582,086 | A * | 12/1996 | Kogame | B26D 3/085 264/139 |
| 6,271,676 | B1 * | 8/2001 | Montoya | H01L 21/6838 279/3 |
| 6,729,213 | B1 * | 5/2004 | Baba | B26D 7/1863 83/13 |
| 2017/0232705 | A1 * | 8/2017 | Nomura | B32B 5/026 442/268 |
| 2020/0234884 | A1 * | 7/2020 | Lee | H01G 4/248 |

FOREIGN PATENT DOCUMENTS

| | | |
|---|---|---|
| JP | 2009246298 | 10/2009 |
| KR | 20050041780 | 5/2005 |
| KR | 20100029802 | 3/2010 |

\* cited by examiner

UPPER MOLD FOR MLCC LAMINATION

BACKGROUND

The present invention relates to an upper mold for MLCC lamination and, more particularly, to an upper mold for MLCC lamination configured such that ultra-thin film sheets for MLCC fabrication are precisely laminated into a lamination array.

In general, for increasing the capacity of a multi-layer ceramic capacitor (MLCC), an area of opposite electrodes is increased, a distance between electrodes is reduced, or a dielectric material with high specific permittivity is applied between electrodes. However, to increase the capacity while maintaining the size to be compact, film sheets mainly having electric circuits are fabricated to have an ultra-thin thickness, and tens to hundreds of ultra-thin film sheets are laminated. For such lamination, a dedicated laminating apparatus for MLCC is used.

Such multi-layer ceramic capacitors (hereinafter referred to as 'MLCCs') are widely used in a variety of fields requiring a compact capacitor, such as for special purposes such as mobile appliance, e.g. a memory module, tuner, etc, military appliance, medical appliance, aircraft, automotive, etc, as well as for IT products (mobile phones, PCs, D-TVs, etc.). Because of high noise removal effect at high frequency over that of other capacitors due to having low internal inductance, the MLCCs serve as compact capacitors with high capacity and reliance, and are thus used in mobile phones, satellite, etc. Generally, the MLCCs are highly compatible parts that are used in a mobile phone (250 or more parts are used) (for smart phones, two times of parts are used relative to a normal mobile phone), a notebook (300 or more parts are used), an LCD TV (700 or more parts are used), or the like.

Like this, laminated layers of such compatible MLCCs are different for target products, such as 250 or more parts in a mobile phone (two times of parts in a smart phone), 300 or more parts in a notebook, 700 or more parts in an LCD TV, or the like.

For implementation of miniaturization and high performance of electronic appliances such as mobile communication device, e.g. a smart phone, tablet PCs, notebooks, smart TVs, etc, recently, the MLCCs are fabricated using film sheets having an ultra-thin thickness of 1.5 μm or less.

Thin-film sheets of such MLCC are fabricated by forming tin-film sheets with a tape casting method, performing a process such as lamination, pressing, cutting, plasticizing, polishing, polishing, or the like, on the thin-film sheets, and forming plating layers for forming electric circuits thereon, generally using a dedicated laminating apparatus for MLCCs.

In the process of laminating thin-film sheets for fabricating the MLCC, a thin-film wound around a supply roll is moved to a predetermined position along a conveyor, and then is cut into a predetermine size.

An upper mold is installed above the conveyor such that the upper mold is movable along a rail. The upper mold is moved down to contact and vacuum-suck the surface of the cut thin-film sheet and moves the sucked thin-film sheet to a lower mold disposed on one side.

The upper mold is moved down at a position above the lower mold, such that, when the upper mold is moved in proximity to the lower mold, the upper mold releases the vacuum pressure and puts the thin-film sheet on the lower mold. This process is repeated until a predetermined number of thin-film sheets are laminated.

Here, the upper mold is provided with a plurality of through-holes, through which air flows with vacuum pressure so as to suck the thin-film sheet. However, when the thin-film sheet is directly sucked through the through-holes, the thin-film sheet is sucked into damaged by the through-holes due to ultra-thin thickness of the thin-film sheet so as to generate a distortion effect. To prevent this effect, a porous mesh plate in a type of nonwoven fabric (mesh) is applied onto the surface of the upper mold, so that the thin-film sheet can be sucked through pores of the mesh plate. Such a mesh plate is formed from synthetic resin.

However, in such a conventional upper mold, when a thin-film sheet is laminated, a cushion effect may occur in the mesh plate due to a porous structure of the mesh plate. Thus, if the thin-film sheet has an ultra-thin thickness of 0.001 mm or less, in the process of laminating the thin-film sheets over the mesh plate, the thin-film sheets may slip due to the cushion effect of the mesh plate, thereby causing a lamination array of thin-film sheets to be distorted or torn.

As such, an array of electric circuits of the thin-film sheets is distorted so that problems arise in that a short-circuit during cutting of hundreds of laminated thin-film sheets and circuit defect of a finished MLCC may occur. Moreover, since the failed products should be disposed, hundreds of normally laminated thin-film sheets should also be disposed, being disadvantageous in terms of economical aspect.

Further, since the mesh plate is continuously pressed and damaged during the lamination process, the mesh plate should be frequently replaced with a new one. Furthermore, since the mesh plate is attached with an adhesive, a difficult, troublesome problem also arises in that the adhesive should be removed and a new adhesive should be applied.

SUMMARY OF THE INVENTION

Accordingly, the present invention has been made keeping in mind the above problems occurring in the related art, and the present invention is intended to propose an upper mold for MLCC lamination capable of configured such that ultra-thin film sheets for MLCC fabrication are precisely laminated into a lamination array and a replacing cycle of a mesh plate is extended by preventing the mesh plate from being pressed and deformed during the lamination of the thin-film sheets.

In order to achieve the above object, according to one aspect of the present invention, there is provided an upper mold for lamination of MLCC including: a vacuum head having a first section and an at least one pair of second sections oppositely formed around and adjacent to the first section, wherein the first section has a plurality of base holes communicating with an air channel formed on an upper surface of the vacuum head, and a through-hole communicating with a lower surface of the vacuum head and respective base holes so as to allow air to flow between the base holes and the lower surface, the first section having a predetermined area, wherein the second section has a plurality of air-suction holes; a mesh plate fixed to the lower surface of the vacuum head so as to have a size corresponding to that of the first section, the mesh plate having a porous structure allowing homogeneous suction and exhaust of air through the through-holes of the first section; and a contact plate fixed to the lower surface of the vacuum head through the suction by the second section in a contact state with the mesh plate so as to allow attachment and detachment of a thin-film sheet depending on a direction of air flowing through the mesh plate.

The contact plate may have an area corresponding to the lower surface of the vacuum head, wherein the contact plate may be provided with a third section having a plurality of fine holes to allow the attachment or detachment of the thin-film sheet using a flow of air through the mesh plate, the third section corresponding to the first section, wherein on opposite sides of the third section corresponding to the second sections, planar suction parts may be provided such that the suction parts are closely attached to the second section through the suction of air by the suction holes.

The vacuum head may be internally provided with air lines communicating with the air-suction holes to allow the suction of air through the air-suction holes of the second section, wherein a suction nozzle may be provided to the air line so as to provide a suction force.

The first section of the vacuum head may be provided with at least one anti-deflection part configured by a plurality of anti-defection holes, and the contact plate may be provided with a planar deflection-suction part at a position corresponding to the anti-deflection part to suck and support the center of the contact plate fixed to the lower surface of the vacuum head to prevent the deflection of the center of the contact plate.

The anti-deflection part and the deflection-suction part may be provided in a direction perpendicular to the second section and the suction part.

The anti-deflection part and the deflection-suction part may be provided in a direction diagonally to the second section and the suction part.

The contact plate may be formed of stainless steel, titanium, or carbon steel.

The contact plate may be circumferentially outwardly provided with a plurality of bent pieces, and the vacuum head may be circumferentially provided with a plurality of support clamps to support the bent pieces of the contact plate.

According to the upper mold for MLCC of the present invention having the above-described configuration, since a pressing force applied to the mesh plate during lamination of the thin-film sheet is blocked by the contact plate, thereby fundamentally preventing the mesh plate from being pressed, there is an outstanding effect that ultra-thin film sheets for the fabrication of MLCC are precisely laminated into a lamination array.

Further, the prevention of the mesh plate from being pressed also prevents the deformation of the mesh plate, thereby having an effect of extending a replacing cycle of the mesh plate.

Further, the contact plate is stably disposed on the upper mold in a flat state without deflection, having a further effect of easily facilitating a function of the mesh plate.

Furthermore, the thin-film sheet is sucked on the contact plate through fine holes of the contact plate, having an effect of completely preventing the surface of the thin-film sheet from being damaged.

DETAILED DESCRIPTION OF THE INVENTION

Preferred embodiments of the present invention will now be described in detail with reference to the accompanying drawings.

Figure 1:
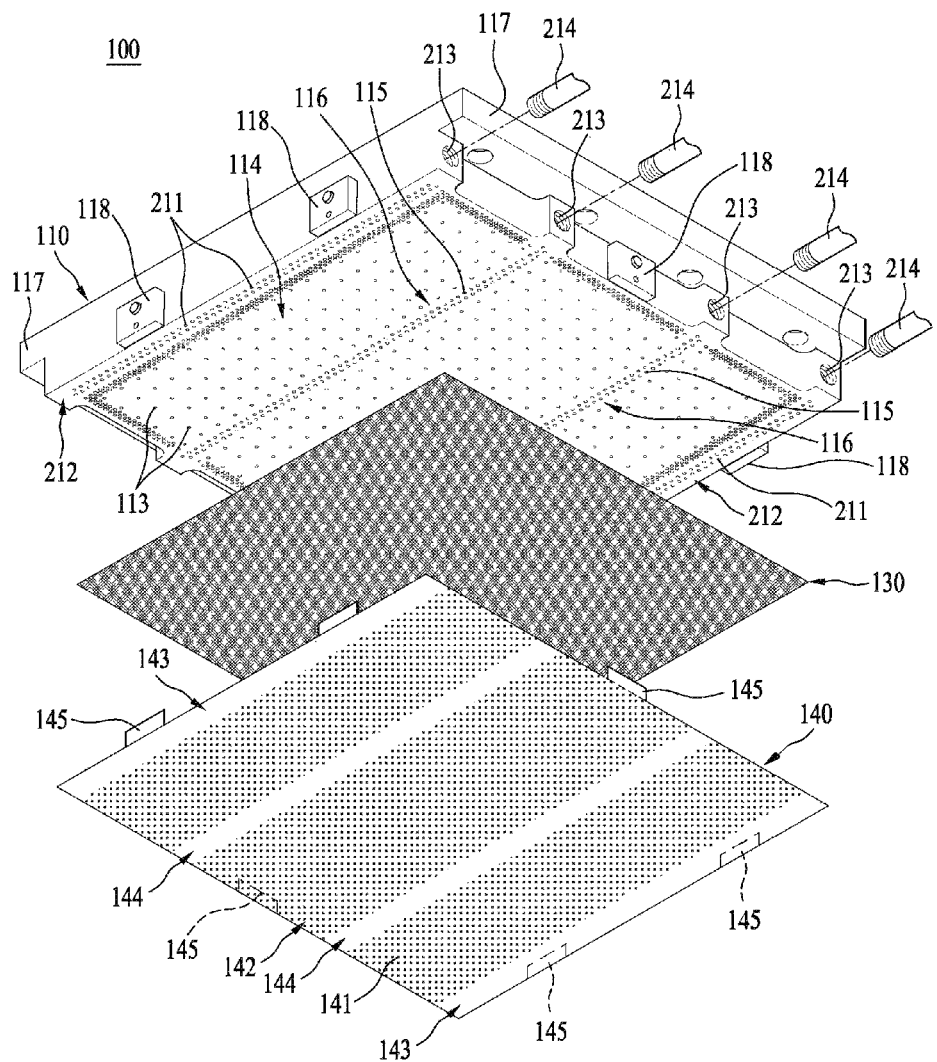
FIG. 1 is an exploded bottom-side perspective view illustrating an upper mold for fabrication of MLCC according to an embodiment of the present invention.
Figure 2:
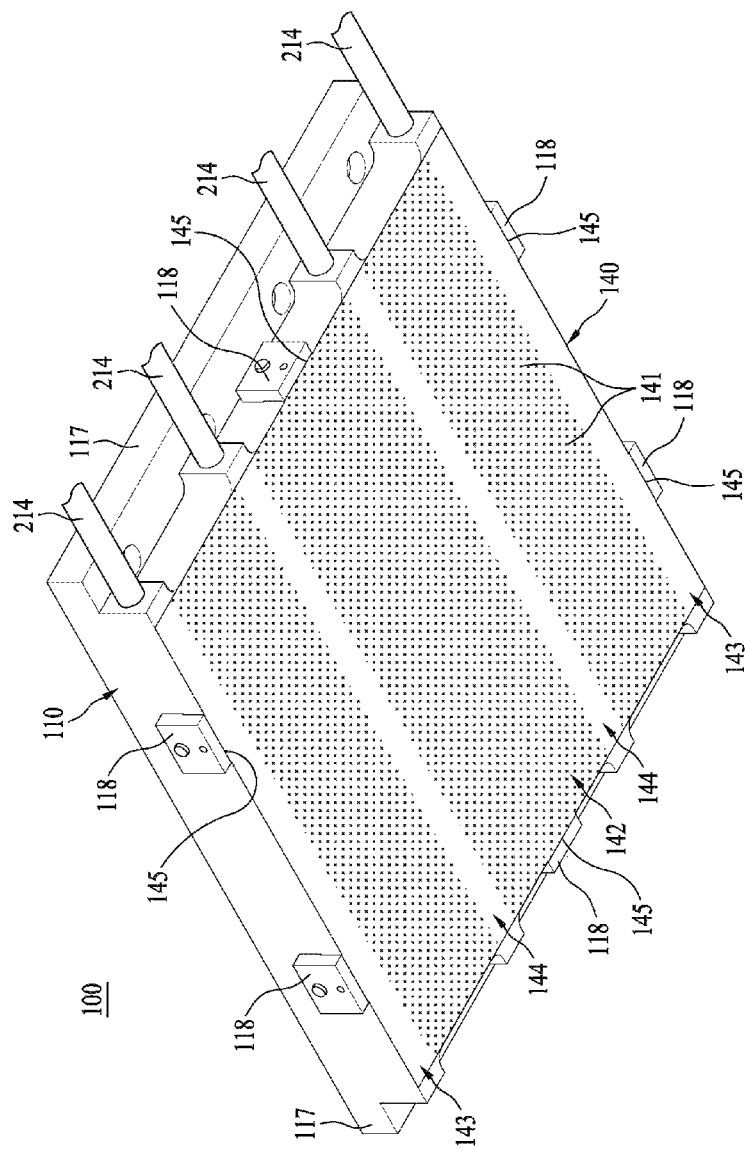
FIG. 2 is a bottom-side perspective view illustrating the assembled upper mold of FIG. 1.
Figure 3:
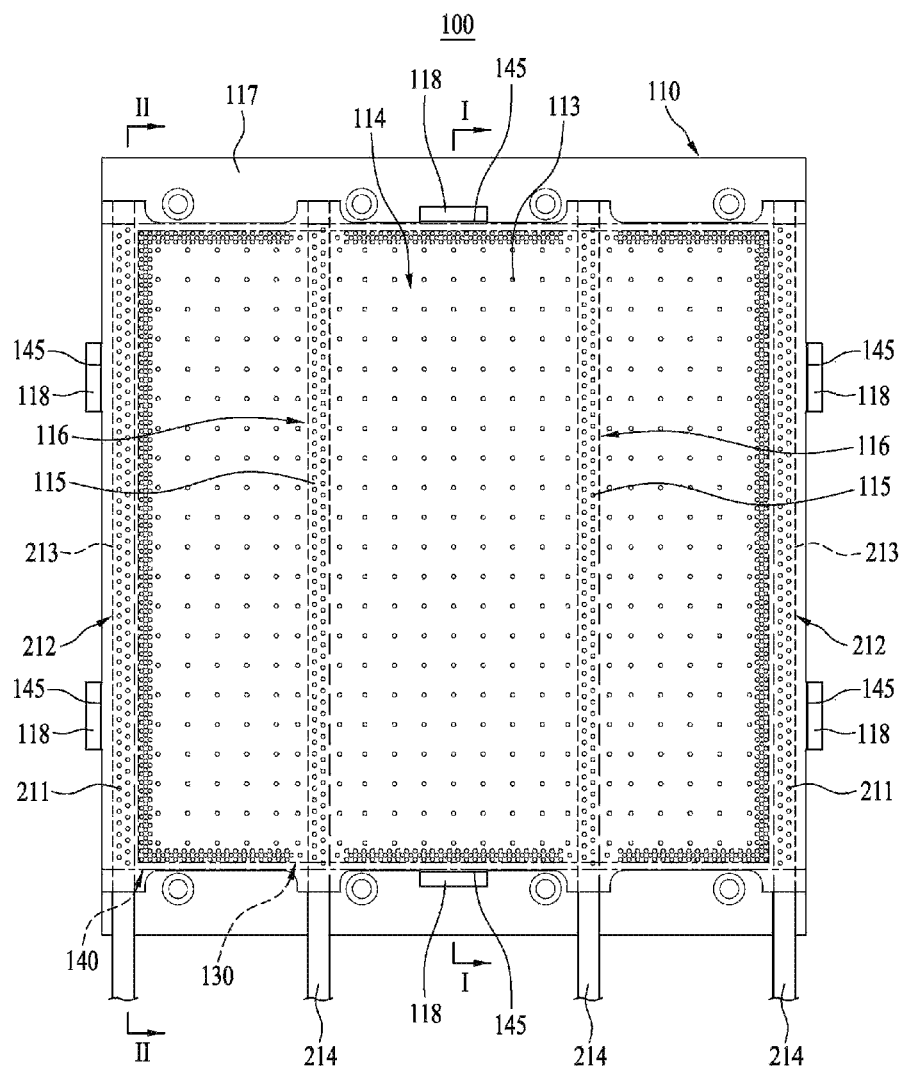
FIG. 3 is a bottom view illustrating a vacuum head of the upper mold for MLCC according to an embodiment of the present invention.
Figure 4:
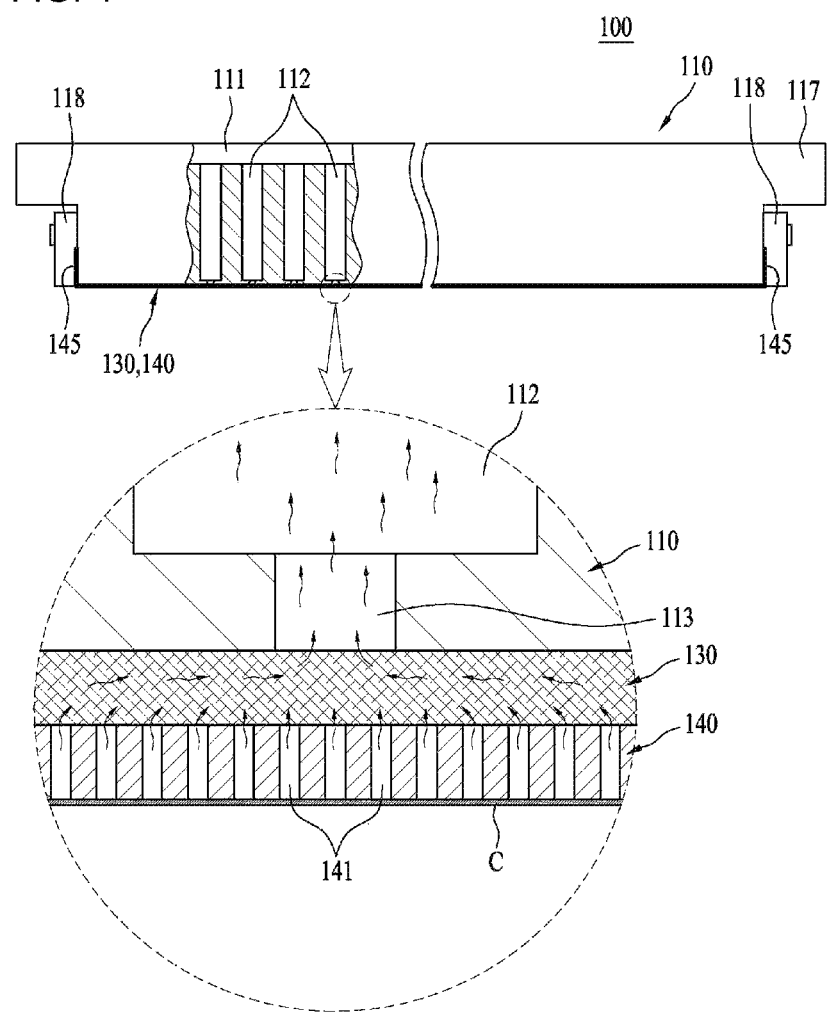
FIG. 4 is a cross-sectional view illustrating a major part of the upper mold taken along line I-I of FIG. 3.
Figure 5:
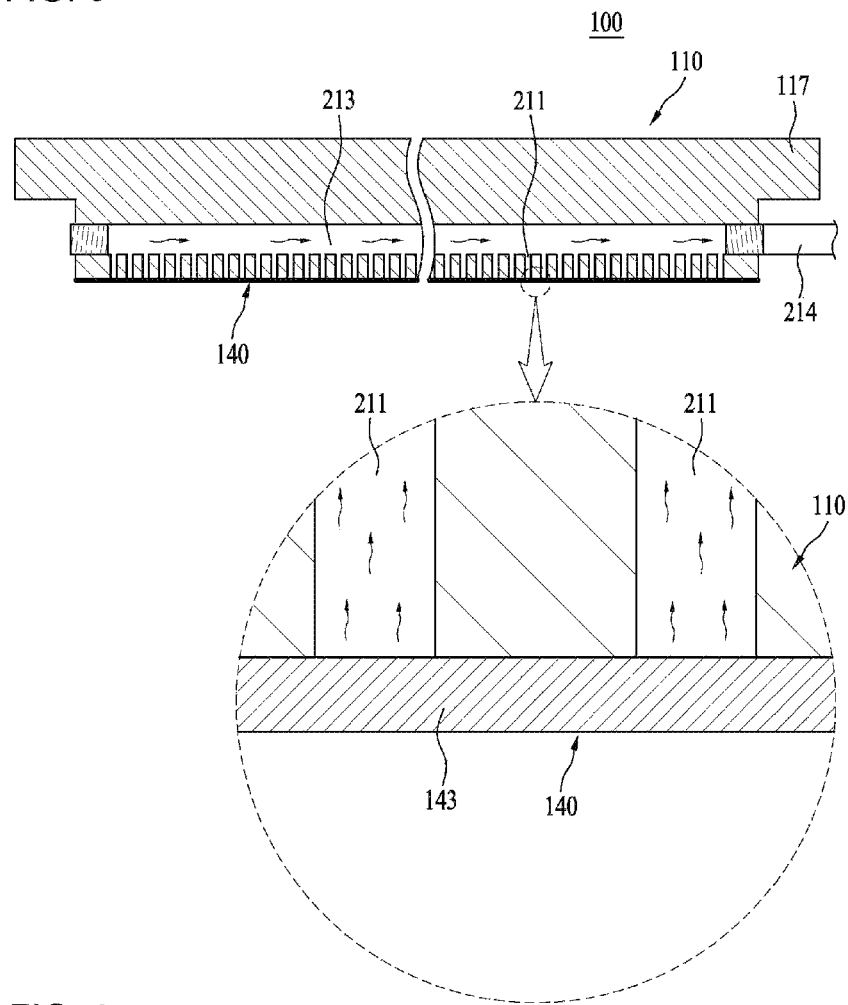
FIG. 5 is a cross-sectional view illustrating a major part of the upper mold taken along line II-II of FIG. 3.
Figure 6:
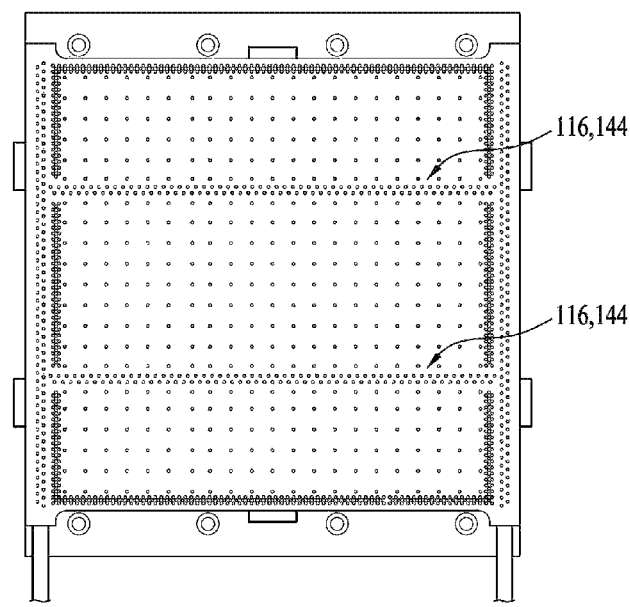
FIG. 6 is a reference view illustrating an anti-defection section and a defection suction part of the upper mold for MLCC according to an embodiment of the present invention.
Figure 7:
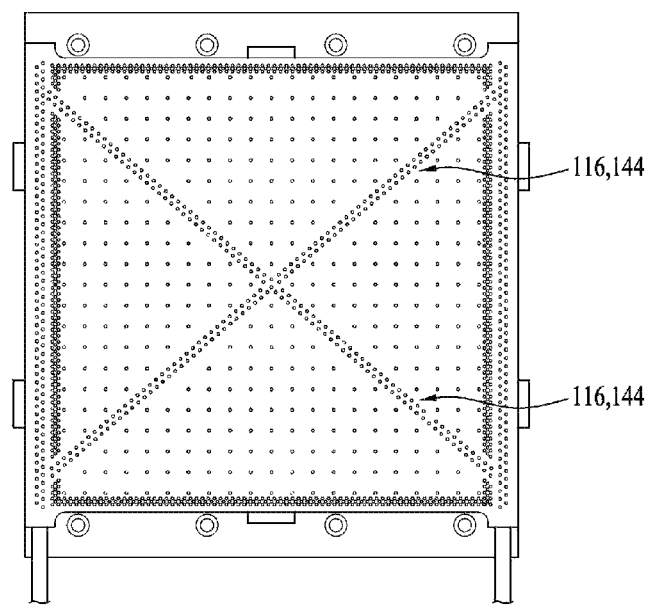
FIG. 7 is a reference view illustrating an anti-defection section and a defection suction part of the upper mold for MLCC according to another embodiment of the present invention.

FIG. 1 is an exploded bottom-side perspective view illustrating an upper mold for fabrication of MLCC according to an embodiment of the present invention. FIG. 2 is a bottom-side perspective view illustrating the assembled upper mold of FIG. 1. FIG. 3 is a bottom view illustrating a vacuum head of the upper mold for MLCC according to an embodiment of the present invention. FIG. 4 is a cross-sectional view illustrating a major part of the upper mold taken along line I-I of FIG. 3. FIG. 5 is a cross-sectional view illustrating a major part of the upper mold taken along line II-II of FIG. 3. FIG. 6 is a reference view illustrating an anti-defection section and a defection suction part of the upper mold for MLCC according to an embodiment of the present invention. FIG. 7 is a reference view illustrating an anti-defection section and a defection suction part of the upper mold for MLCC according to another embodiment of the present invention.

As illustrated in FIGS. 1 to 5, an upper mold 100 for the lamination of a multi-layer ceramic capacitor (MLCC) includes a vacuum head 110 having a first section 114 and an at least one pair of second sections oppositely formed around and adjacent to the first section, wherein the first section has a plurality of base holes 112 communicating with an air channel 111 formed on an upper surface of the vacuum head, and a through-hole 113 communicating with a lower surface of the vacuum head and respective base holes 112 so as to allow air to flow between the base holes and the lower surface, the first section having a predetermined area, wherein the second section 212 has a plurality of air-suction holes 211; a mesh plate 130 fixed to the lower surface of the vacuum head 110 so as to have a size corresponding to that of the first section 114, the mesh plate having a porous structure allowing homogeneous suction and exhaust of air through the through-hole 113 of the first section 114; and a contact plate 140 fixed to the lower surface of the vacuum head 110 with the suction by the second section 212 in a contact state with the mesh plate 130 so as to allow attachment and detachment of a thin-film sheet C according to a flow direction of air flowing through the mesh plate 130.

The upper mold 100 for lamination of MLCC is characterized in that after sequentially sucking the thin-film sheets C having an ultra-thin thickness of 0.001 mm, the upper mold is moved to a position above a lower mold by a separate transfer member and is lowered towards the lower mold (not shown) and sequentially laminates the thin-film sheets such that a pressing force applied to the mesh plate when the thin-film sheet C is laminated on the lower mold is blocked, so that the thin-film sheets C can be precisely laminated into a lamination array without defection.

As illustrated in FIGS. 1 to 5, the vacuum head 110 has a rectangular block shape with a specified area, wherein brackets 117 are formed on opposite sides thereof so as to be connected to a transfer member for moving the vacuum head 110 for suction and lamination of the thin-film sheet C by the vacuum head 110.

As illustrated in FIG. 4, the vacuum head 110 is provided on an upper surface thereof with an air channel 111, which is recessed in the upper surface of the vacuum head, and is connected to an air supply, which is not shown in the drawings.

The base holes 112 extend from the air channel 111 towards the lower surface of the vacuum head 110 in a fluid-communication manner.

Here, the base holes 112 are formed into diverse shapes such as a circle, an oval, etc, by drilling and milling. However, a diameter of the base hole 112 varies depending on the number of the through-holes 113, which will be described below, and is not limited to a specified value.

As illustrated in FIG. 4, the bottom side of the base hole 112 is provided with one or more through-holes 113 to connect the lower surface of the vacuum head 110 and the base hole 112 in a fluid-communication manner. The lower surface of the vacuum head 110 is provided with the first section 114 having the through-holes 113 as illustrated in FIGS. 1 and 3, wherein the first section has a predetermined area.

Here, the first section 114 serves to suck or discharge air through the lower surface of the vacuum head 110, and the area of the first section may vary depending on the side of the thin-film sheet C.

The second sections 212 are formed on opposite sides of the first section 114.

As illustrated in FIGS. 1 and 3, the second section 212 are formed, as an opposing pair, on the lower surface of the vacuum head 110, adjacent to the periphery of the first section 114. The second section is provided with a plurality of air-suction holes 211.

That is, the second section 212 serves to suck and hold the contact plate 140 through the suction of air by the air-suction holes 211 (see FIG. 5).

To this end, the vacuum head 110 may preferably be internally provided with air lines 213 which extend along the length of the second section 212 in a fluid-communication manner with the air-suction holes 211 in order to allow the suction of air through the air-suction holes 211 of the second section 212.

A suction nozzle 214 is provided to the air line 213 so as to provide a sucking force. The suction nozzle 214 is connected to an air supply, which is not shown in the drawings.

The configuration in which the air lines 213 are installed in the vacuum head 110 is provided to allow the suction nozzle 214 to be properly installed according to the structure of an apparatus and working environment. Further, the opposite side of the air line 213 to the suction nozzle 214 should be closed by a sealing member (not shown).

Although the embodiment illustrates that the second sections 212 are oppositely arranged on the left and right sides in the drawings, the second sections may be arranged on four sides of the periphery of the first section 114, so the position thereof is not limited to a specified place.

Thus, the vacuum head 110 serves to allow attachment or detachment of the thin-film sheet C to or from the contact plate 140 through a flow of air through the through-holes 113 of the first section 114, and to suck and hold the contact plate 140 onto the lower surface of the vacuum head 110 through the suction by the suction holes 211 of the second section 212.

The mesh plate 130 is secured to the lower surface of the vacuum head 110 so as to allow homogeneous suction or exhaust of air through the through-holes 113 of the first section 114, wherein the mesh plate 130 has the size corresponding to that of the first section 114.

In this case, the mesh plate 130 is formed from synthetic resin plate having a thickness of 0.15 to 0.2 mm, and the mesh plate 130 has a nonwoven fabric-type porous structure in which upper and lower surfaces thereof are formed in a flat manner.

The thickness of 0.15 to 0.2 mm is provided to allow an easy flow of air through the mesh plate 130.

The mesh plate 130 is secured to the first section 114 of the lower surface of the vacuum head 110 by means of an adhesive.

Thus, the mesh plate 130 is fixed to the lower surface of the vacuum head while covering the first section 114 of the lower surface, thereby allowing homogeneous suction or exhaust of air through the through-hole 113 of the first section 114.

As illustrated in FIGS. 1 to 5, the contact plate 140 is fixed to the lower surface of the vacuum head 110 through the suction by the through-holes 211 of the second section 212, in a contact state with the mesh plate 130 secured to the first section 114 of the vacuum head 110, so as to attach or detach the thin-film sheet C according to a direction of air flowing through the mesh plate 130 through the through-holes 113 of the first section 114.

The contact plate 140 has an area corresponding to that of the lower surface of the vacuum head 110 as shown in FIG. 2. The contact plate is provided with a third section 142 having a plurality of fine holes 141 to allow attachment or detachment of the thin-film sheet C using a flow of air through the mesh plate 130. The third section corresponds to the first section 114. On opposite sides of the third section 142 corresponding to the second sections 212, suction parts 143 are provided such that the suction parts are closely attached to the second section 212 through the suction of air by the suction holes 211.

Here, the contact plate 140 has an area larger than that of the mesh plate 130.

The contact plate is preferably formed of stainless steel, titanium, or carbon steel. Among them, SUS304 stainless steel is most preferable.

The third section 142 of the contact plate 140 is provided with 200,000 to 300,000 fine holes 141 with diameters of 0.15 mm or less, wherein the fine holes are formed with an etching process.

The formation of the fine holes 141 is for allowing air to be supplied to the mesh plate 130 to ensure stable suction of the thin-film sheet C throughout the third section 142 and for preventing excessive suction of the ultra-thin sheet C of 0.001 mm or less thickness.

The lower surface of the contact plate which is brought into contact with the thin-film sheet C is preferably polished in a roughness (Ra) of 0.02 to 0.06 μm. If Ra is less than 0.02 μm, it is difficult to easily detach the thin-film sheet C due to substantially low roughness. On the contrary, if Ra is above 0.06 μm, an electric circuit of the thin-film sheet C may be damaged due to the roughness. The most ideal roughness is 0.04 μm.

As illustrated in FIGS. 1 and 2, suction parts 143 are disposed on opposite sides of the third section 142, and have a flat surface such that the suction parts are closely attached to the second section 212 through the auction of air through the suction holes 211 of the second section 212, wherein the flat surface is polished along with the second section 212.

As the suction parts 143 are sucked and held onto the second section 212, the contact plate 140 is secured to the lower surface of the vacuum head 110 (FIG. 5).

The contact plate 140 is larger than the mesh plate 130, since the suction parts 143 are formed on opposite sides of the contact plate.

As illustrated in FIGS. 1 and 2, preferably, the contact plate 140 is circumferentially outwardly provided with a plurality of bent pieces 145, and the vacuum head 110 is circumferentially provided with a plurality of support clamps 118 to support the bent pieces 145 of the contact plate 140.

The bent piece 145 is integrally formed with the contact plate 140 such that the bent piece extends and bends towards the vacuum head 110.

The support clamp 118 is formed into a thick plate on the periphery of the vacuum head 110 so as to hold the bent piece 145 that is inserted into the support clamp. The number of the support clamps corresponds to that of the bent pieces 145.

Here, a step (not shown) is provided on one side of the support clamp facing the periphery of the vacuum head 110 to allow the bent piece 145 to be inserted.

Thus, the support clamp 118 resiliently supports the bent piece 145 inserted between the support clamp 118 and the periphery of the vacuum head 110 such that the bent piece 145 is slightly moved towards the contact plate 140 by a separate support member.

To resiliently support the contact plate 140 is to prevent a fatigue load applied to a bent part of the bent piece 145 upon attachment or detachment of the thin-film sheet C through a flow of air in the case where the contact plate 140 is secured to the support clamp too tightly.

Although the embodiment illustrates that six bent pieces 145 and 6 support clamps 118 are provided on the vacuum head 110 and the contact plate 140, respectively, the number of the bent pieces and the support clamps may vary depending on the size of the vacuum head 110 and the contact plate 140.

Thus, the contact plate 140 is resiliently supported by the support clamp 118 at the time when the contact plate is disposed on the lower surface of the vacuum head 110 in a state in which the suction parts 143 covers the mesh plate 130 through the suction of air through the second section 212. Further, a hard material of the contact plate prevents the mesh plate 130 from being pressed during the lamination of the thin-film sheets C. Further, since the suction is performed by the fine holes 141 of the third section 142, the thin-film sheets C can be stably sucked.

In the meantime, the contact plate 140 may be disposed on the lower surface of the vacuum head 110 in a state in which the contact plate is attached to the mesh plate 130 by means of an adhesive without forming the second sections 212 and the suction parts 143. However, in this case, a problem arises in that the adhesive is melt with heat generated during the lamination of the thin-film sheets C, and permeates into and blocks the fine holes 141 of the contact plate 140. Further, since the contact plate 140 is only attached to the mesh plate 130 by means of an adhesive, a conventional problem that the mesh plate 130 is pressed during the lamination of the thin-film sheet cannot be overcome.

In the mean time, as illustrated in FIG. 1, the first section 114 of the vacuum head 110 is provided with at least one anti-deflection part 116 configured by a plurality of anti-defection holes 115 along the direction of the second section 212, and the contact plate 140 is provided with a planar deflection-suction part 144 at a position corresponding to the anti-deflection part 116.

This is for sucking and supporting the deflection-suction part 144 with the suction of air through the anti-deflection holes 115 in order to prevent the deflection of the center of the contact plate by weight, which deflection occurs as only the opposite sides of the contact plate 140 are attached to the lower surface of the vacuum head 110 by the second sections 212.

Here, in order to provide a suction force to the anti-deflection part 116, like the structure of the second sections 212, the vacuum head 110 is provided with air lines 213 communicating with the anti-deflection holes 115 of the anti-deflection part 116, wherein suction nozzles 214 are connected to the air lines.

Although the embodiment illustrates that two anti-deflection parts 116 and two deflection-suction parts 144 are provided, the number of the anti-deflection parts and the suction parts may vary depending on the size of the contact plate 140.

In the meantime, as illustrated in FIGS. 6 and 7, the anti-deflection part 116 and the deflection-suction part 144 may be respectively provided on the vacuum head 110 and the contact plate 140 in a different direction.

In FIG. 6, the anti-deflection part 116 and the deflection-suction part 144 are respectively provided in a direction perpendicular to the second section 212 and the suction part 143.

In FIG. 7, the anti-deflection part 116 and the deflection-suction part 144 are respectively provided in a direction diagonal to the second section 212 and the suction part 143.

As such, the anti-deflection part 116 and the deflection-suction part 144 may be selectively provided in a perpendicular or diagonal direction.

In this case, the anti-deflection parts 116 provided in respective directions have the same structure as that of the second section 212, and opposite ends of the air line 213 of the anti-deflection part 116 are connected to the air line 213 of the second section 212 in a fluid-communication manner.

Hereinafter, the operation of the upper mold 100 for lamination of MLCC will be described with reference to the accompanying drawings.

First, a thin-film sheet C fed from a winding roll (not shown) along a conveyor is cut to have a predetermined size by a wheel cutter.

The upper mold 100 is moved to a position above the cut thin-film sheet C by a transfer member (not shown) and is lowered towards the cut thin-film sheet C such that the thin-film sheet is sucked and attached to the lower surface of the contact plate 140.

Here, a suction force is generated through the air channel 111 of the vacuum head 110 by an air supply so as to allow air to flow in an arrow direction shown in FIG. 4.

That is, the air is sucked through the fine holes 141 provided on the entire area of the third section 142 of the contact plate 140, and flows towards the air channel 111 through the respective through-holes 113 and the base holes 112 while flowing through the porous structure of the mesh plate 130.

As such, the thin-film sheet C is sucked and attached to the third section 142 of the contact plate 140 through the suction of air.

In the meantime, since the contact plate 130 is already supplied with a suction force from an air supply before the thin-film sheet C is sucked through four suction nozzles 214 connected to respective air lines 213 of the vacuum head 110, the pair of deflection-suction parts 144 is sucked onto the pair of second sections 212 as illustrated in FIG. 5, so that the contact plate is securely supported by the lower surface of the vacuum head 110.

When the thin-film sheet C is sucked through the above process, the upper mold 100 is moved up and is transferred along a track to a position above the lower mold that is fixed at a predetermined location.

The upper mold 100 positioned above the lower mold is lowered such that the sucked thin-film sheet C is laminated on the upper surface of the lower mold.

Here, the air supply blocks the suction action and blows air at the same time in order to detach the thin-film sheet C from the contact plate 140 when the thin-film sheet C is laminated on the lower mold.

Then, as the air is exhausted through the fine holes 141 of the third section 142, the thin-film sheet C is instantly detached from the third section 142.

Further, blown air is generated and the suction through the suction nozzle 214 is simultaneously blocked. This is for allowing the blown air to be entirely exhausted through the third section 142 of the contact plate 140 without being affected by the suction force through the second section 212.

As such, the upper mold 100 is slightly lowered at the time when the thin-film sheet C is detached from the contact plate, so that the upper mold laminates the thin-film sheet C on the lower mold while slightly pressing the thin-film sheet, thereby completing the lamination.

Here, since the contact plate 140 formed of stainless steel presses the thin-film sheet C, it can be understood that the mesh plate 130 is fundamentally prevented from being pressed.

In the meantime, after one thin-film sheet C is laminated, the upper mold 100 returns to a position where the cut thin-film sheet C is provided, through a rail, and then the above-mentioned processes are repeated so that a predetermined number of thin-film sheets C are laminated on the lower mold.

Then, the laminated thin-film sheets C are famed into an MLCC through a post process, which is known in the art, so a detailed description thereof will be omitted.

According to the upper mold for MLCC of the present invention having the above-described configuration, since a pressing force applied to the mesh plate during lamination of the thin-film sheet is blocked by the contact plate, thereby fundamentally preventing the mesh plate from being pressed, there is an outstanding effect that ultra-thin film sheets for the fabrication of MLCC are precisely laminated into a lamination array.

Further, the prevention of the mesh plate from being pressed also prevents the deformation of the mesh plate, thereby having an effect of extending a replacing cycle of the mesh plate.

Further, the contact plate is stably disposed on the upper mold in a flat state without deflection, having a further effect of easily facilitating a function of the mesh plate.

Furthermore, the thin-film sheet is sucked on the contact plate through fine holes of the contact plate, having an effect of completely preventing the surface of the thin-film sheet from being damaged.

Although the preferred embodiments of the upper mold for lamination of MLCC according to the present invention have been disclosed with reference to the accompanying drawings, they are provided merely for illustrative purposes, and are not intended to limit the technical scope of the invention thereto.

That is, those skilled in the art will appreciate that various modifications, additions and substitutions are possible, without departing from the scope and spirit of the invention, and such modifications, additions, and substitutions fall within the technical scope of the invention as disclosed in the accompanying claims.

The invention claimed is:

1. An upper mold (100) for the lamination of a multi-layer ceramic capacitor (MLCC) by sucking and laminating an ultra-thin sheet (C) on a lower mold, the upper mold comprising:
   a vacuum head having a first section and an at least one pair of second sections oppositely formed around and adjacent to the first section, wherein the first section has a plurality of base holes communicating with an air channel formed on an upper surface of the vacuum head, and a through-hole communicating with a lower surface of the vacuum head and respective base holes so as to allow air to flow between the base holes and the lower surface, the first section having a predetermined area, wherein the second section has a plurality of air-suction holes;
   a mesh plate fixed to the lower surface of the vacuum head so as to have a size corresponding to that of the first section, the mesh plate having a porous structure allowing homogeneous suction and exhaust of air through the through-holes of the first section; and
   a contact plate fixed to the lower surface of the vacuum head through the suction by the second section in a contact state with the mesh plate so as to allow attachment and detachment of a thin-film sheet (C) depending on a direction of air flowing through the mesh plate,
   wherein the contact plate has an area corresponding to the lower surface of the vacuum head, wherein the contact plate is provided with a third section having a plurality of fine holes to allow the attachment or detachment of the thin-film sheet (C) using a flow of air through the mesh plate, the third section corresponding to the first section,
   wherein on opposite sides of the third section corresponding to the second sections, planar suction parts are provided such that the suction parts are closely attached to the second section through the suction of air by the suction holes.

2. The upper mold for lamination of MLCC according to claim 1, wherein the vacuum head is internally provided with air lines communicating with the air-suction holes to allow the suction of air through the air-suction holes of the second section, wherein a suction nozzle is provided to the air line so as to provide a suction force.

3. The upper mold for lamination of MLCC according to claim 1, wherein the first section of the vacuum head is provided with at least one anti-deflection part configured by a plurality of anti-defection holes, and the contact plate is provided with a planar deflection-suction part at a position corresponding to the anti-deflection part to suck and support the center of the contact plate fixed to the lower surface of the vacuum head to prevent the deflection of the center of the contact plate.

4. The upper mold for lamination of MLCC according to claim 3, wherein the anti-deflection part and the deflection-suction part are provided in a direction perpendicular to the second section and the suction part.

5. The upper mold for lamination of MLCC according to claim 3, wherein the anti-deflection part and the deflection-suction part are provided in a direction diagonal to the second section and the suction part.

6. The upper mold for lamination of MLCC according to claim 1, wherein the contact plate is formed selected from the group consisting of stainless steel, titanium, and carbon steel.

7. The upper mold for lamination of MLCC according to claim 1, wherein the contact plate is circumferentially outwardly provided with a plurality of bent pieces, and the vacuum head is circumferentially provided with a plurality of support clamps to support the bent pieces of the contact plate.

\* \* \* \* \*